United States Patent [19]

Kapp et al.

[11] Patent Number: 4,572,568
[45] Date of Patent: Feb. 25, 1986

[54] TRUCK BED LINER SECURING DEVICE

[75] Inventors: Gregory W. Kapp, St. Joseph; LeRoy Van Kirk, White Pigeon, both of Mich.

[73] Assignee: LRV Corporation, Elkhart, Ind.

[21] Appl. No.: 651,334

[22] Filed: Sep. 17, 1984

[51] Int. Cl.$^4$ .............................................. B62D 33/00
[52] U.S. Cl. .................................... 296/39 R; 52/735; 52/721
[58] Field of Search ........... 296/39 R; 248/300, 221.3; 52/735, 721, 715, 278; 224/42.42 R

[56] References Cited

U.S. PATENT DOCUMENTS

| | | | |
|---|---|---|---|
| 4,047,749 | 9/1977 | Lambitz et al. | 296/39 R |
| 4,181,349 | 1/1980 | Nix et al. | 296/39 R |
| 4,333,678 | 6/1982 | Munoz et al. | 296/39 R |
| 4,336,963 | 6/1982 | Nix et al. | 296/39 R |
| 4,341,412 | 7/1982 | Wayne | 296/39 R |

Primary Examiner—Robert R. Song
Attorney, Agent, or Firm—James D. Hall

[57] ABSTRACT

A device for use in securing a liner in the bed of a truck having side walls with an inwardly extending upper flange and a lip extending downwardly therefrom. The device has a back portion with a clamp disposed near the upper edge thereof for engaging and gripping the lip, and a base portion extending outwardly from the back portion for engaging the truck wall and stabilizing the device. A screw is inserted through the liner and into the back portion of the device, thereby holding the liner in place while allowing relative expansion and/or contraction between the liner and the bed from temperature changes without causing distortion of or damage to the liner.

12 Claims, 5 Drawing Figures

U.S. Patent   Feb. 25, 1986   Sheet 1 of 2   4,572,568
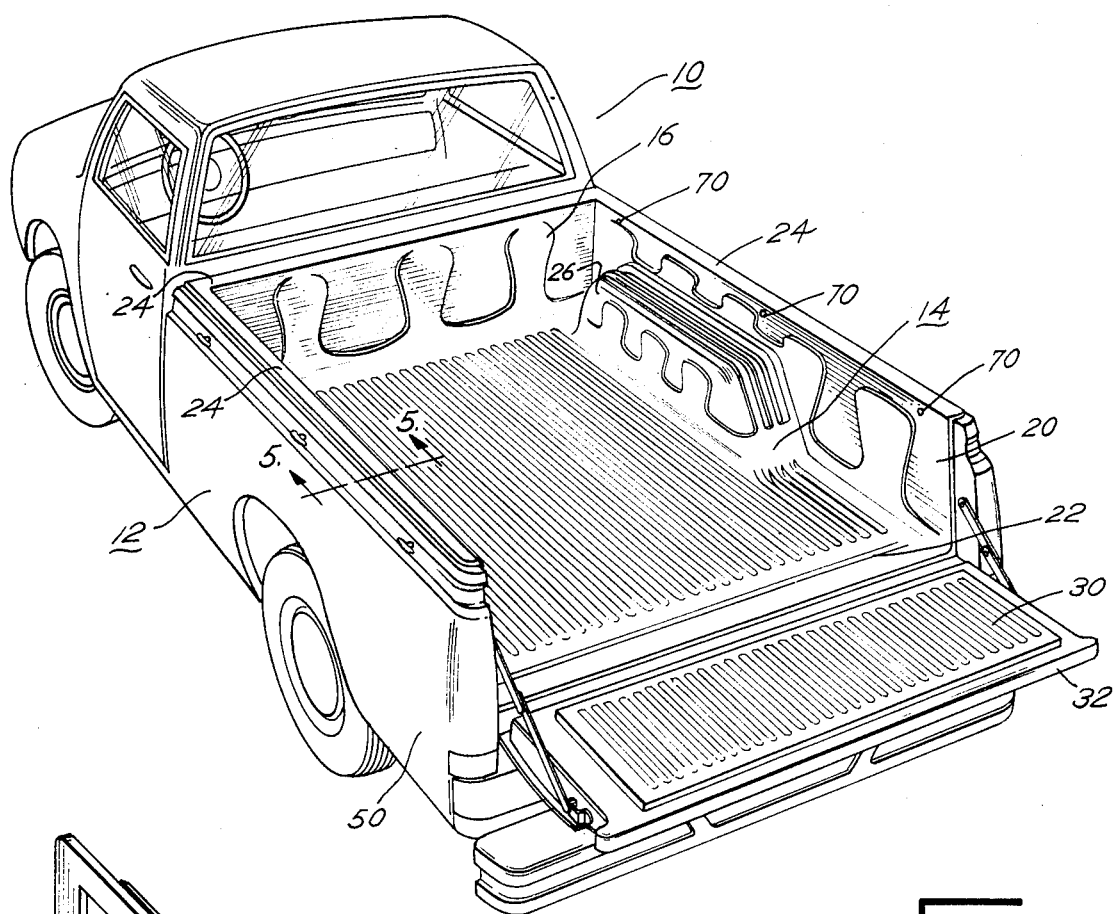
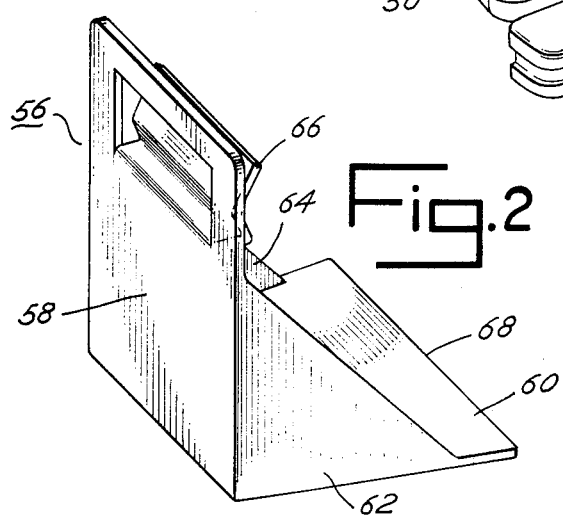
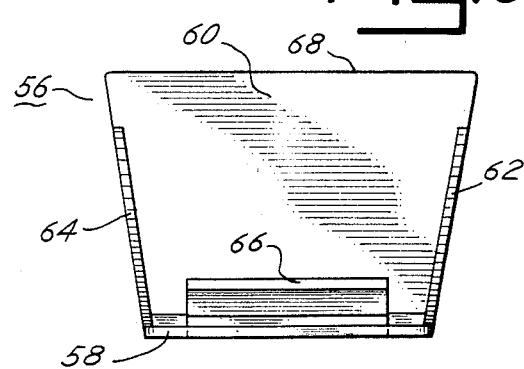

TRUCK BED LINER SECURING DEVICE

BACKGROUND OF THE INVENTION

The beds of pickup trucks and similar vehicles are normally finished in the same manner as the outside of the vehicles; that is, the same type of sheet metal and paint finish are used therefor, presenting a uniform appearance when the vehicle is new. Such vehicles, however, are often subjected to severe duty, such as the transporting of construction materials, tools, firewood, and like materials which are likely to scrape, scratch, and otherwise mar the finish of the inside of the truck bed. Eventually, from the combined effects of abrasive use, weathering, and other deleterious conditions, the truck bed loses its like-new appearance. In vehicles used exclusively for heavy industrial or agricultural purposes, the condition of the truck bed may not be a great concern, but for more general purposes, the condition of the truck bed is as important as the condition of the rest of the vehicle. As the finish of the truck bed becomes marred by the scraping or scratching of the paint, rust quickly develops on the unprotected sheet metal. Where severe, the rust will eventually destroy the bed and will, at the least, make the bed generally unsuitable for light duty uses, such as the transporting of passengers or grocery bags, and greatly reduce the resale value of the vehicle.

Many manufacturers, therefore, now provide truck bed liners to protect the finish of the bed from damage caused by abrasive cargoes. The liners generally conform to the shape of the bed and provide the requisite protective covering to maintain its condition. When necessary for resale or other purposes, the liners can normally be removed, thereby exposing the bed with the original finish unmarred by previously transported cargo. The liners, in conforming to the shape of the truck bed, generally cover the bottom and sides of the bed and have flanges which extend outwardly from the sides of the liner to cover the upper edges of the sides of the truck bed. Holes are then normally drilled through the flanges and the upper edges of the sides of the truck bed for receiving screws which secure the liner thereto.

The above procedure has certain definite disadvantages. Drilling holes in the truck body provides additional sites from which rust may develop as the protective paint covering is removed or chipped away by the drilling. Since the liners are normally of a plastic material, and are exposed outdoors a great deal of the time, the liners are subject to expansion and contraction from temperature extremes, and at a different rate from that of the metal used for the truck body. Thus, the liners may buckle, warp, pull loose, or crack, due to the nonuniform expansion and contraction of the truck body and the liner, reducing their attractiveness and effectiveness. In addition, the movement of the unsecured portions of the liner relative to the rigidly secured flanges often leads to cracking of the liner around the screws and eventually requires replacement of the liner. If the truck is to be resold and the liner is removed, the truck bed will normally be in good condition, but the drilled holes remain, providing rust-formation sites and an unsightly appearance.

Another type of liner securing means which has been used commercially consists of expansion anchoring bolts extending through the outwardly extending flanges into the stake pockets of the bed side walls. This type of securing means also has many of the same disadvantages as the previously described screws in the flanges, particularly with respect to the nonuniform expansion of the bed liner in response to changes in temperature.

SUMMARY OF THE INVENTION

It is, therefore, one of the principal objects of the present invention to provide a truck bed liner securing device which securely holds the liner in the bed of the truck or other vehicle without the need to drill holes in or otherwise affect the integrity of the bed.

Another object of the present invention is to maintain the secure installation of the bed liner despite expansion and contraction of the liner relative to the bed from extremes of temperature.

A further object of the present invention is to provide a truck bed liner securing device which can be used with different vehicle beds, and which is durable yet inexpensive to produce.

A still further object of the present invention is to provide a liner securing device that is reusable, should the liner need to be removed from a particular vehicle and then reinstalled or transferred to a different vehicle.

These and additional objects are attained by the present invention, which relates to a truck bed liner securing device for use with pickup truck beds having external sheet metal side walls with an inwardly extending upper edge flange and a lip extending downwardly therefrom. The present liner securing device has a base portion which seats against the internal surface of the external side wall of the vehicle, and a back portion with a clamping means near the upper edge thereof for engaging the lip which extends downwardly from the upper edge flange of the side wall. A suitable fastening means is then inserted through the liner and into the present device to secure the liner in the bed of the truck. With no direct connection between the liner and the truck bed, the two are free to expand and/or contract in response to temperature changes without causing stress or distortion of the liner. The liner and the present securing device may then also be removed or reinstalled as necessary, without affecting the integrity of the truck bed.

Various other objects and advantages of the present invention will become apparent from the following description, with reference to the accompanying drawings.

BRIEF DESCRIPTION OF THE DRAWINGS

FIG. 1 is a perspective view of a pickup truck showing the bed with a liner secured therein, using the present truck bed liner securing device;

FIG. 2 is a perspective view of the present truck bed liner securing device;

FIG. 3 is a top plan view of the present securing device;

DETAILED DESCRIPTION OF THE PREFERRED EMBODIMENT

Figure 4:
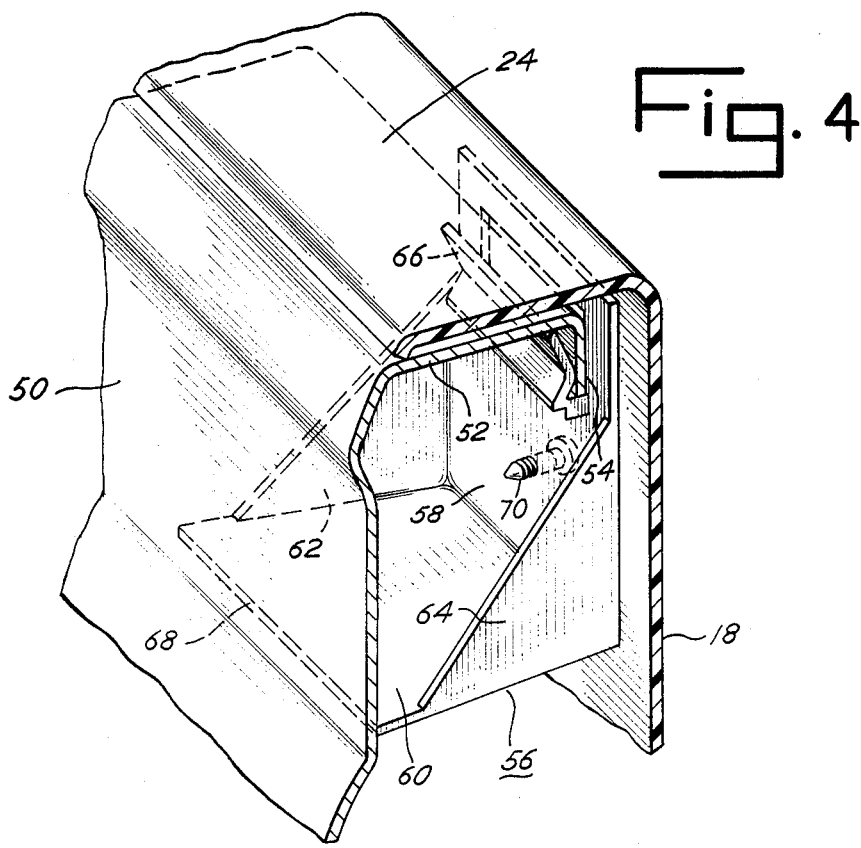
FIG. 4 is a fragmentary, perspective, vertical cross-sectional view of the wall of the pickup truck bed and liner, showing the present liner securing device in use clamped to the truck wall with the liner secured thereto.

Referring more specifically to the drawings, and to FIG. 1 in particular, numeral 10 designates generally a pickup truck having a bed 12 with a pre-formed liner 14 installed therein. The liner has a front end wall 16, side walls 18 and 20, and a bottom 22. Extending outwardly from the front and side walls of the liner is a flange 24, which extends over the upper edges of the front and side walls of the truck bed. The front and side walls, the bottom, and the covering flange 24 are formed integrally and sized to fit a particular brand and model of pickup truck. The liner is normally of a relatively heavy, plastic material and generally conforms to the inner configuration of the truck bed, including wells 26 on each side for receiving the wheel wells of the truck bed. A rear end liner wall 30 is provided as a separate item for covering and protecting the inside wall of the tailgate 32. The liner 14, thus installed, serves as the inner walls and bottom surface of the truck bed, receiving any materials placed in the bed and protecting the truck bed from abrasion or damage from the cargo. The liner is normally installed in new vehicles and remains in place until resale of the truck, when it can be removed to expose the unmarred finish of the truck bed.

Figure 5:
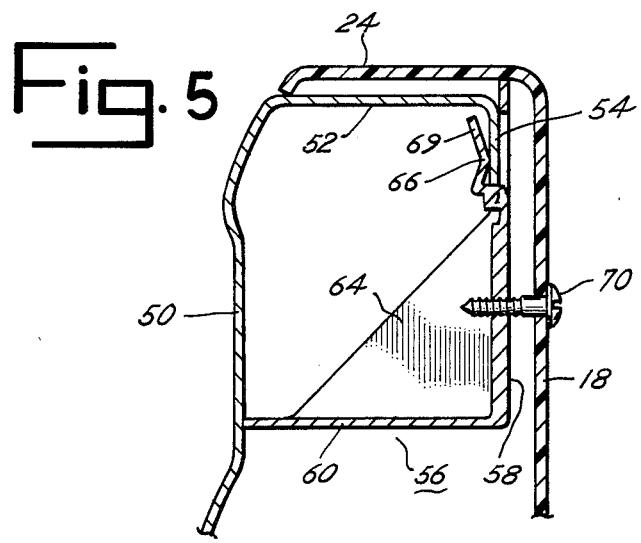
FIG. 5 is a fragmentary, cross-sectional view similar to that of the preceding figure, showing the device in place and in use in the truck bed, the view being taken on line 5—5 of FIG. 1.

The present truck bed liner securing device may be used for installing liners in any vehicle having the general bed configuration of truck bed 12, the main difference being in the dimensions of the bed. The side walls of the truck bed are formed of relatively rigid sheet metal and have an external panel 50 with an inwardly extending upper edge flange 52 and a downwardly extending lip 54, as shown in FIGS. 4 and 5. The present securing device, designated generally by numeral 56, is shown in FIGS. 2 through 5, and includes a generally vertical back portion 58, a generally horizontal base portion 60, and side braces 62 and 64. Disposed near the upper edge of back portion 58 is a holding or clamping means, such as clamp 66. The device 56 is of such a size that clamp 66 engages the downwardly extending lip 54 of the truck side wall, and the outermost edge 68 of base portion 60 engages the inner surface of the external truck side panel 50. The relative dimensions of the present device will vary, depending on the make and model of the truck. As seen in FIGS. 3 and 4, the base portion 60 is angled outwardly to provide stability for the device when mounted against the inner wall of the truck. The base portion 60 and the back portion 58 are disposed generally perpendicular to one another, and the side braces 62 and 64, disposed angularly between the outer edges of the base and back portions, provide further strength and stability for the present device.

Clamp 66 is designed to receive lip 54, thereby holding the device in place inside the truck bed. The clamp shown in this embodiment is formed from a relatively hard, yet resilient, plastic material, the angular portion 69 of which is pushed outwardly by lip 54 when the device is mounted. The clamp is biased to return essentially to its original position, thereby securely holding the lip between the clamp and the upper part of back portion 58. In the embodiment shown here, the present device is formed from a relatively hard, resilient plastic; however, other materials are equally suitable. For example, the device can be stamped from metal or formed from nylon, and the clamp portion can be hinged and spring-biased or formed from spring steel to securely hold the lip of the truck side wall.

With the device clamped in position, a hole is drilled through the side of the liner and the back portion 58. A suitable fastening means, such as a self-tapping screw 70, is then inserted through the holes to fasten the liner to the securing device 56. In the embodiment shown in FIG. 1, three of the securing devices are used on each side of the truck bed. This number may, of course, vary with the relative length of the bed. Extreme forward or rearward movement of the liner relative to the truck bed is prevented by the engagement of the front end wall 16 of the liner with the front end wall of the bed, and by the interlocking relationship of the liner wells 26 with the wheel wells of the truck. Some movement is permitted, however, since the liner is not directly secured to the truck bed. The clamps 66, while securing the device to the lip of the truck wall, are slidable laterally to accommodate slight movement of the liner relative to the truck bed from expansion and/or contraction of the liner or the bed due to temperature fluctuations. Thus, buckling or other distortion of the liner is prevented, but the liner is securely held within the bed of the truck, and the flanges 24 of the liner are held against the upper edges of the truck sides due to their shape and the relative proximity of the securing devices to the flanges.

In the use and operation of the present truck bed liner securing device, a suitable number of the devices 56 are secured by clamp 66 to the downwardly extending lip 54 of the side walls of the pickup truck bed. The liner 14 is then laid in position in the truck bed and holes are drilled through the side walls 18 and 20 of the liner and the back portions 58 of the securing devices. Suitable fasteners, such as self-tapping screws 70, are then threaded through the corresponding holes to fasten the liner to the securing devices, independently of the truck bed. Once screw 70 has been inserted in the drilled holes in the liner side wall and device 56, the device is held securely in place, with the bottom of clamp 66 abutting against the lower edge of lip 54 to prevent the liner from becoming upwardly displaced, and with clamp 66 and edge 68 preventing lateral movement of the liner side wall in either direction. Relative expansion and/or contraction of the liner and bed are thus permitted without distortion of or damage to the liner. The liner may be easily removed, if desired, by removing the screws 70, thus freeing the liner for removal. The securing devices are then simply pulled off the lip 54, revealing the protected and undamaged truck bed. The securing devices and liner may also then be reinstalled, as described above, in the same or a similar truck, if desired.

While only one embodiment of a truck bed liner securing device has been shown and described in detail herein, various changes and modifications may be made without departing from the scope of the present invention.

I claim:

1. In combination, a truck bed having front and side walls with inwardly extending upper edges and lips extending downwardly therefrom, a liner for said bed having a bottom panel with front and side walls extending upwardly therefrom, a plurality of securing devices slidably securing the liner walls to the respective truck bed side walls, each of said devices having clamping means for engaging the downwardly extending lip of the truck wall, a back portion extending downwardly from said clamping means and generally parallel with the liner wall, a base portion extending outwardly from said back portion to contact the inner surface of the bed side wall, and fastening means extending through the liner wall and into said back portion to hold the liner wall thereto.

2. The combination defined in claim 1 in which said clamping means includes a deflectable member biased to return to its original position after deflection by the lip.

3. The combination defined in claim 1 in which said fastening means is a self-tapping screw.

4. The combination defined in claim 1 in which said back portion and said base portion are disposed perpendicular to one another, and said device includes braces extending from said base portion to said back portion.

5. The combination defined in claim 4 in which said fastening means is a self-tapping screw.

6. The combination defined in claim 1 in which said base portion has sides that angle outwardly from said back portion and a correspondingly wide outer edge for stabilizing said device against the truck wall.

7. The combination defined in claim 6 in which said clamping means includes a deflectable member biased to return to its original position after deflection by the lip.

8. A device for use in securing a liner in a pickup truck bed having side walls with an upper flange extending inwardly therefrom and a lip extending downwardly from the inside edge of the flange, said device comprising:
   a. a back portion having a clamping means near the upper edge thereof for engaging the lip;
   b. a base portion extending outwardly from said back portion for contacting the wall of the truck bed; and
   c. a fastening means for engagement with said back portion for securing the liner to said device.

9. A truck bed liner securing device as defined in claim 8 in which said back portion and said base portion are disposed perpendicular to one another, and are joined to one another near the bottom of said back portion.

10. A truck bed liner securing device as defined in claim 8 in which said clamping means includes a yieldable member biased to return to its original position after being deflected by the lip for gripping the lip between said member and said back portion.

11. A truck bed liner securing device as defined in claim 8 in which said fastening means includes a self-tapping screw.

12. A truck bed liner securing device as defined in claim 11 in which said base portion has sides which angle outwardly from said back portion and a correspondingly wide outer edge for stabilizing said device against the truck wall.

* * * * *